(12) United States Patent
Watson et al.

(10) Patent No.: US 8,636,934 B2
(45) Date of Patent: *Jan. 28, 2014

(54) METHOD OF MAKING DETECTABLE SIGNAGE

(75) Inventors: Virgil Allen Watson, Salem, IA (US); Jason Bender, Mount Pleasant, IA (US); Carl Frank, Mount Pleasant, IA (US)

(73) Assignee: Lomont Molding, Inc., Mt. Pleasant, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/434,329

(22) Filed: Mar. 29, 2012

(65) Prior Publication Data

US 2012/0192471 A1    Aug. 2, 2012

Related U.S. Application Data

(60) Division of application No. 12/904,470, filed on Oct. 14, 2010, which is a continuation-in-part of application No. 12/766,286, filed on Apr. 23, 2010, now Pat. No. 7,985,364.

(51) Int. Cl.
   *B29C 45/14*        (2006.01)

(52) U.S. Cl.
   USPC ...... 264/135; 264/132; 264/275; 264/328.12; 264/328.18

(58) Field of Classification Search
   None
   See application file for complete search history.

(56) References Cited

U.S. PATENT DOCUMENTS

| | | | |
|---|---|---|---|
| 3,093,865 A | 6/1963 | Peters et al. | |
| 3,352,040 A | 11/1967 | Simon | |
| 3,951,375 A | 4/1976 | Lovell | |
| 4,427,618 A | 1/1984 | Sorensen | |
| 4,891,399 A | 1/1990 | Ohkawa et al. | |
| 5,104,720 A * | 4/1992 | Sano et al. | 428/195.1 |
| 5,604,006 A * | 2/1997 | Ponchaud et al. | 428/67 |
| 5,804,117 A | 9/1998 | Baba et al. | |
| 5,916,047 A | 6/1999 | Schickert et al. | |
| 5,962,042 A | 10/1999 | Konno | |
| 5,980,400 A | 11/1999 | Schickert | |
| 6,004,231 A | 12/1999 | Schickert et al. | |
| 6,007,759 A * | 12/1999 | Ten Tije et al. | 264/478 |
| RE37,506 E * | 1/2002 | Morita | 264/246 |
| 6,875,301 B2 * | 4/2005 | Kauppi et al. | 156/245 |
| 7,514,131 B2 | 4/2009 | Funato et al. | |
| 7,624,525 B2 | 12/2009 | Frank et al. | |
| 2005/0191449 A1 | 9/2005 | Funato | |
| 2007/0214695 A1 | 9/2007 | Frank et al. | |
| 2007/0269671 A1 | 11/2007 | Hirschfelder et al. | |
| 2008/0197620 A1 | 8/2008 | Spencer et al. | |

FOREIGN PATENT DOCUMENTS

| | | |
|---|---|---|
| CA | 2418159 | 1/2002 |
| CA | 2719793 A1 | 10/2009 |
| GB | 2465161 A | 5/2010 |

* cited by examiner

*Primary Examiner* — Edmund H. Lee
(74) *Attorney, Agent, or Firm* — Zarley Law Firm, P.L.C.

(57) ABSTRACT

Signage is presented comprising an in-mold plastic plate portion having a slot. The signage has a flexible tongue having a neck portion that extends outwardly from the plate portion and has a locking tip extending from the neck portion and the locking tip is formed to be received by the slot. The plastic plate portion is made of a filler material and a detectable additive such that the signage is easily detected by a metal detecting machine.

9 Claims, 4 Drawing Sheets

METHOD OF MAKING DETECTABLE SIGNAGE

CROSS REFERENCE TO A RELATED APPLICATION

This application is a division of U.S. Ser. No. 12/904,470 filed Oct. 14, 2010, still pending, which is a continuation-in-part of Ser. No. 12/766,286 filed Apr. 23, 2010, now U.S. Pat. No. 7,985,364.

BACKGROUND OF THE INVENTION

This invention relates to injection molded products. More specifically, and without limitation, this invention relates to detectable signage and a method for producing injection molded detectable signage.

Attachable and detachable signage is used in countless applications and in countless industries to inform personnel of relevant information. As one example, in the food manufacturing or meat processing industry, signage is often attached to shipments of incoming raw materials or outgoing finished products to identify: (a) the date the shipment was received, (b) whether the shipment was inspected or who inspected the shipment, (c) the origin of the shipment, (d) the contents of the shipment, (e) the destination of the shipment, as well as countless other information and/or a marking area. While this signage varies in size, shape and design, conventionally much of this signage takes the form of a plastic injection molded tag having a label positioned thereon which contains the relevant information. While this conventional plastic injected molded signage may adequately inform personnel of relevant information contained thereon, problems still exist.

As an example, a problem exists when conventional plastic injection molded signage falls into these shipments.

In particular, in the food manufacturing or meat processing industry, a common method of inspecting these shipments for contaminants is through the use of automated metal detectors or magnetic material detectors. As conventional plastic injection molded signage does not contain metallic material, should a conventional plastic injection molded signage fall into the shipment, the signage will not be detected. This inability to detect the presence of contaminating signage allows for an unacceptably high risk of contamination, or requires additional manual inspection steps which increases processing time and costs. Therefore a need exists in the art for signage that is more easily detected.

Thus, a principal object of the present invention is to provide signage that is detectable.

Another object of the present invention is to provide a method of manufacturing detectable signage.

These and other objectives, features and advantages will be apparent to those of ordinary skill in the art based on the following written description.

BRIEF SUMMARY OF THE INVENTION

Signage is presented comprising an in-mold plastic plate portion having a slot. The signage has a flexible tongue having a neck portion that extends outwardly from the plate portion and has a locking tip extending from the neck portion and the locking tip is formed to be received by the slot. The plastic plate portion is made of a filler material and a detectable additive such that the signage is easily detected by a metal detecting machine.

DETAILED DESCRIPTION OF THE PREFERRED EMBODIMENT

Figure 1:
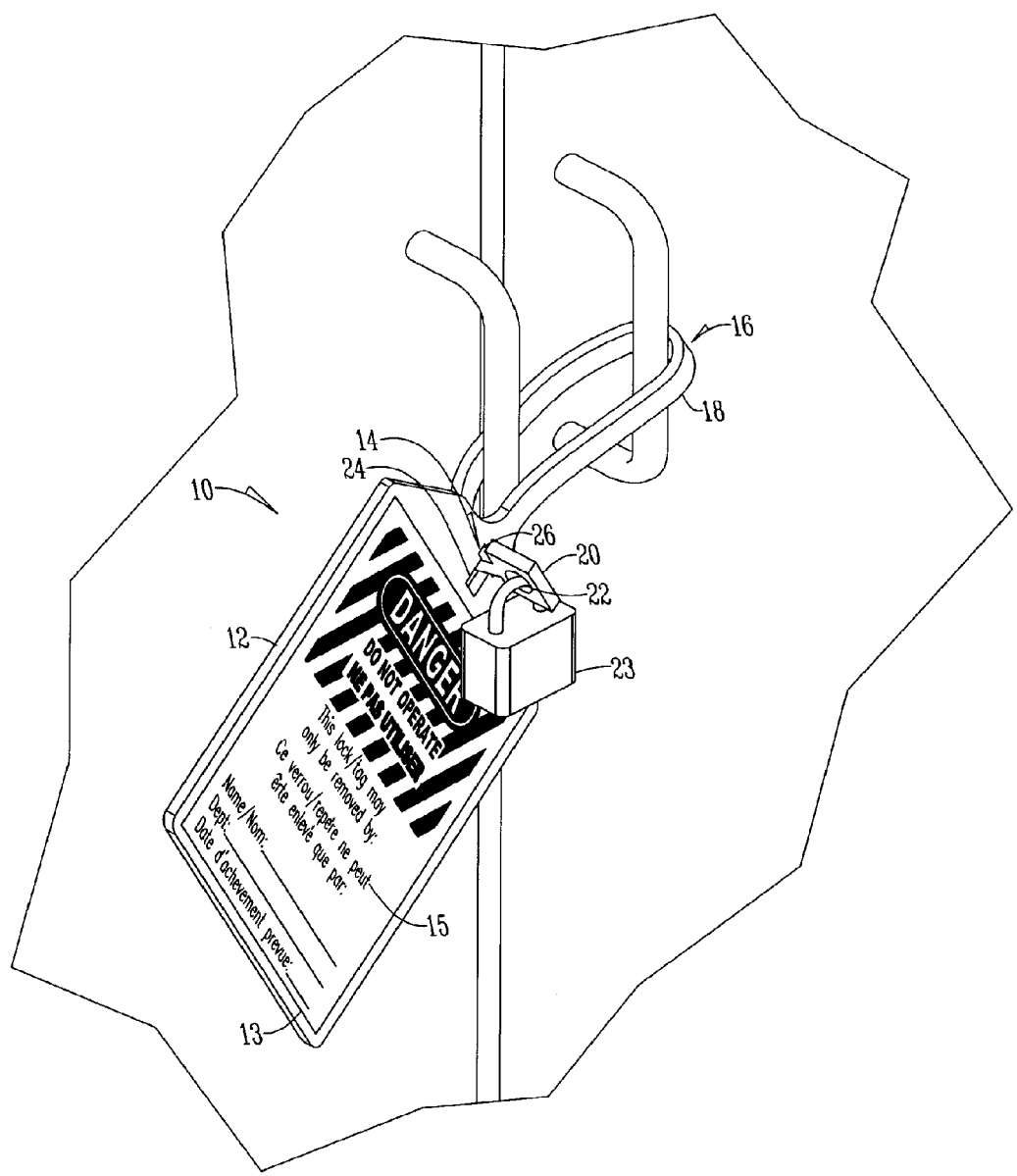
FIG. 1 is a perspective view of a tag and a lock.
Figure 2:
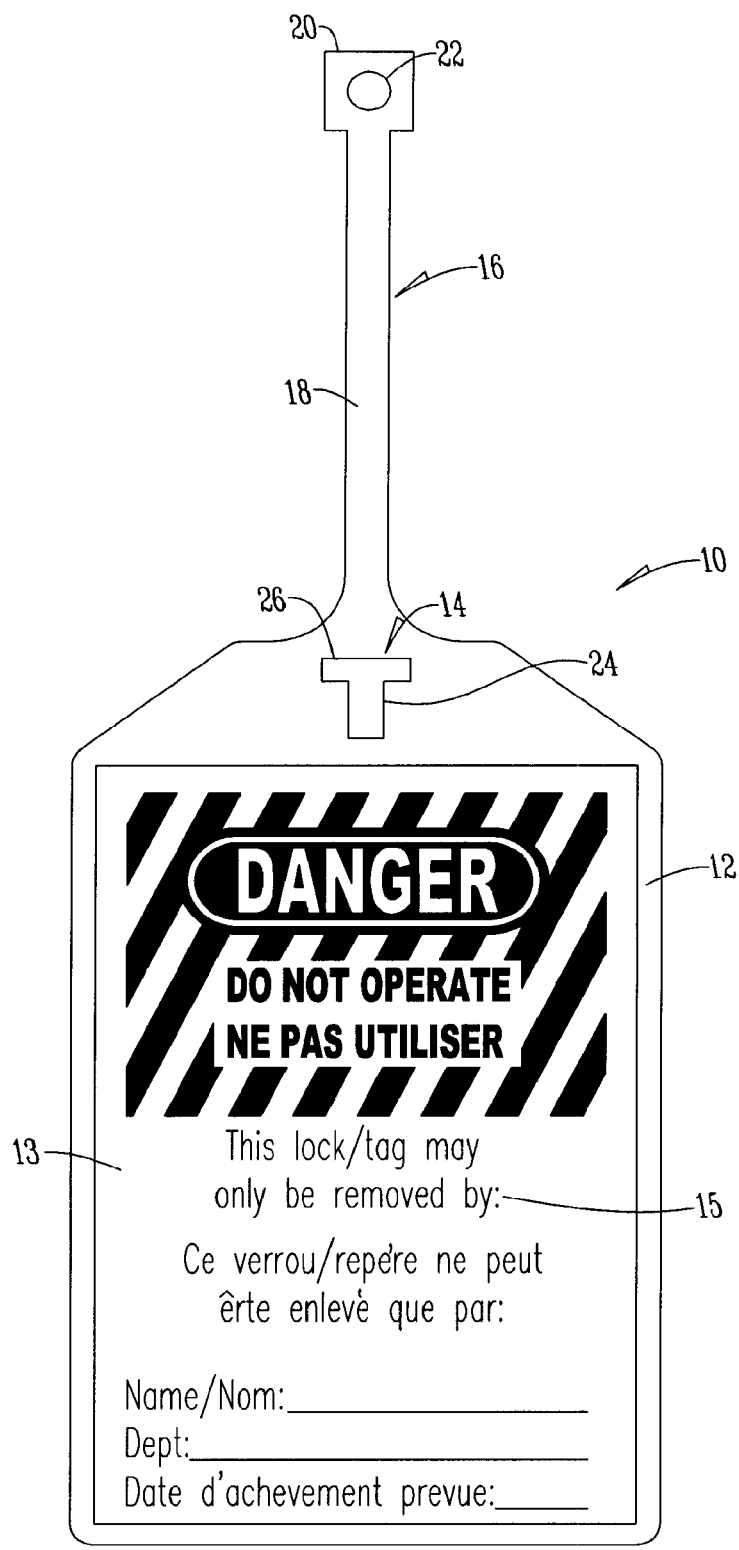
FIG. 2 is a top plan view of a tag.

Referring to the figures, as an exemplary embodiment, a tag 10 has a plate portion 12. Molded within the plate portion 12 is a sheet 13 having a graphics and printed indicia 15. The graphics and indicia 15 may include a warning as well as information indicating the individual authorized to remove the tag 10 and/or a marking area.

Extending through the plate 12 is a slot 14. While the slot is of any shape and size, preferred is a T-shaped slot. Extending outwardly from the plate portion 12 is an extension or tongue 16 having a neck portion 18. In an alternative embodiment, the tongue 16 and neck portion 18 of tag 10 are replaced with any integral wire tie known in the art. This integral wire tie includes one, two or more strands of a malleable wire covered in a plastic material, as is well known in the art, which extend outwardly from the top of tag 10. These malleable wires are then twisted or lockingly engaged with one another to attach tag 10. Alternatively, this integral wire tie includes a conventional zip-tie arrangement, as is well known in the art, having an extended tongue having locking notches thereon, and a locking head having a slot with a locking mechanism therein. The tongue of the zip-tie arrangement is then passed through the locking head of the zip-tie arrangement thereby locking tag 10 in place.

The tongue 16 also has a locking tip 20. The locking tip 20 is formed to be received within the slot 14 such that once the tip 20 passes through the slot and is twisted the tip 20 is retained by the tip 20 engaging a surface of the plate portion 12. The neck 18 is made of a flexible material such that the neck 18 may be bent to permit the tip 20 to be received by and pass through the slot 14. The locking tip 20 has an aperture 22 adapted to receive a lock 23, such as a conventional padlock.

In use, a tag 10 is attached to a shipment, article, device, product or other object by way of bending tongue 16 around a portion of the object so that the locking tip 20 is received by and passes through the slot 14. In the embodiment shown in the drawings, the neck 18 is bent and twisted such that the tip 20 slides through the narrow section 24 of the T-shaped slot 14. Once through the slot 14, when the neck 18 is permitted to untwist, the neck 18 is received in the transverse section 26 of the slot 14, such that an edge of the tip engages a surface of the plate portion 12. Once the tip 20 is retained, should the user desire, lock 23 is inserted through aperture 22 and locked in place.

In operation the body of tag 10 which includes plate portion 12, tongue 16, and neck portion 18 is manufactured as a single continuous piece through an injection molding process. In a first step, granulated, powdered or liquefied plastic, rubber, thermoplastic, thermosetting plastic, or the like filler material is combined with a detectable additive which is also granulated, powdered or liquefied, or is otherwise in a non-dusting form such as pellets. In a second step the combined filler material and the detectable additive is operatively mixed and heated such that a homogeneous detectable material results. Alternatively, the filler material and detectable additive are individually heated to a liquefied form, and then combined with one another in a liquefied form and thereafter mixed to create a homogenous material. The resulting fluid or liquefied homogeneous combination of the filler material and detectable additive is then used in a manufacturing method, such as an injection molding process.

In one embodiment a sheet or label 13 is added to an opened injection mold with graphics or printed indicia 15 facing away from the cavity of the mold. The injection mold is then closed and the fluid homogeneous filler material and detectable additive is injected through a nozzle into the cavity of the mold. The fluid homogenous material contacts the non-indicia side of label 13 and bonds therewith and solidifies to form a single functional unit. In certain applications, binding or gluing material is placed on the non-indicia, or cavity side of the label 13 to further promote adhesion of the label 13 to the signage.

The detectable additive is a detectable metal material, or a magnetically detectable material such as any metallic or ferrous material. In one embodiment, detectable additive is PolyMag® material manufactured by Eriez Manufacturing Co., 2200 Asbury Road, Erie, Pa. 16506.

In a preferred embodiment, the quantity of the detectable additive is extremely small. The quantity of detectable additive is between 1% and 40% by weight of the mixed homogeneous detectable material, and preferably between 5% and 20% of the mixed homogeneous detectable material. The addition of the detectable additive visibly changes the color of the filler material. As an example, when the detectable additive is added to a white filler material the resulting product is somewhat grey in color. As another example, when the detectable additive is added to a red filler material the resulting product is a darker red or a somewhat maroon color. The resulting homogenous detectable mixture can further be pigmented any color through the addition of further coloring additives. Besides the detectable nature and somewhat darker color, the addition of the detectable additive does not otherwise affect the physical properties of the resulting product such as strength, melting point, etc.

Figure 3:
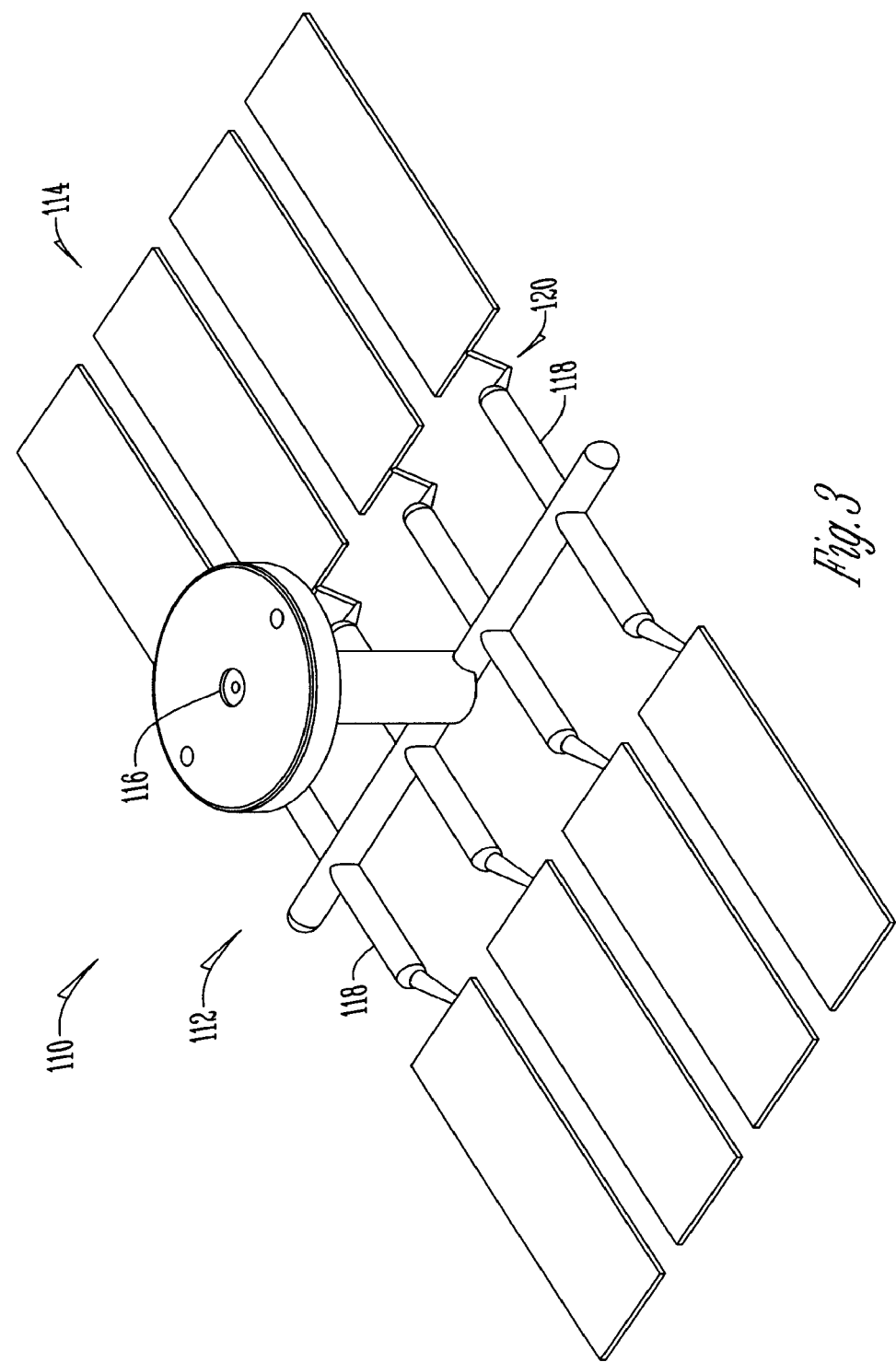
FIG. 3 is a perspective view of an injection molding machine.
Figure 4:
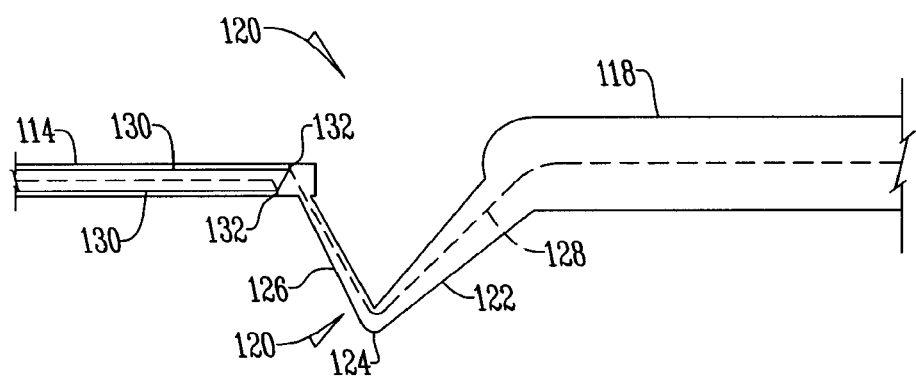
FIG. 4 is a sectional view of the connection between a runner system of an injection molding machine and the mold cavity.

As one exemplary way of making the detectable signage is presented with reference to the parent application, U.S. patent application Ser. No. 12/766,286 filed on Apr. 23, 2010 for a METHOD OF MANUFACTURING AN INJECTION MOLDED PRODUCT. With reference to FIGS. 3 and 4, an injection molding assembly 110 is presented that has a runner system 112 that injects molten thermoplastic and detectable additive into a mold cavity 114. The runner system 112 has an inlet 116 and a system of conduits 118 that provide a fluid flow of pressurized thermoplastics therethrough. Connecting the system of conduits 118 with the mold cavity 114 are a plurality of gate members or tunnel gates 120.

The gate members 120 each have a first section 122 that angles downwardly from the conduit 18 of the runner system 12 toward the mold cavity 114. The first section 122 tapers inwardly to a joint 124. A second section 126 of the tunnel gate 120 extends upwardly from the joint 124 toward the mold cavity 114. In this manner, the first and second sections form a V-shape. The second section 126, like the first section, tapers inwardly such that the diameter of the connection between the gate member 120 and the conduit 118 is greater than the connection between the gate member 120 and the mold cavity 114. In addition, the second section 126 is at an angle such that the flow of material 128 into the second section 126 enters the mold cavity 14 nearly perpendicular to the flow of material 128 through the mold cavity 114.

Within the mold cavity 114 is an indicia carrier 130 that has a first edge 132. The indicia carrier 130 in one embodiment is a label. Specifically, multiple indicia carriers 130 can be utilized including a carrier 130 that has man readable labels and carriers 130 that have Radio Frequency Identification (FRID) that are non line of sight and machine readable only.

In operation, molten thermoplastic is injected through the runner system 112 to the gate member or tunnel gate 120. The thermoplastic is displaced through the gate member 120 and into the mold cavity onto the edge 132 of the indicia carrier 130 nearly perpendicular to the planar surface of the indicia carrier 130. This has the effect of mechanically pinning the indicia carrier 130 into the proper position. Thereafter as the molten thermoplastic fills the cavity 114 air bubbles and wrinkles under the indicia carrier 130 are forced out and the finished product is smooth, bubble and wrinkle free such that the indicia carrier is 100% fused to the thermoplastic. Specifically, this manufacturing process exceeds all sanitation requirements. First, the entire mass of the product is brought to 395 F and then over 1,500 pounds of pressure is exerted to force it into the tool. The product is then subjected to a packing pressure until it solidifies.

In one embodiment the tag, label, sign or the like has an indicia carrier 130, both on the front and rear of the molded product such that a man readable indicia is on one side and FRID indicia is on the other side. In this embodiment the molten thermoplastic impinges on the edge 132 of a first indicia carrier 130 and is then reflected backward onto the edge 132 of a second indicia carrier 130 thereby pinning both indicia carriers 130 within the mold cavity 14 as best shown by the flow of material 128 in FIG. 4. Thus, a label utilizing a RFID is provided.

In an embodiment where ejector pins, as known in the art, are used and placed in close proximity to the gate member 120, upon the finished part injection the tag, label, sign or the like formed in the mold is sheared off of the plastic runner system 112. This eliminates the need for operators to cut and trim individual tags or labels.

Thus provided is a method for manufacturing an injected molded product that utilizes gate members 120 to provide a more efficient process and improved product. In addition, as compared to traditional tag manufacturing that requires reinforcement around an attachment hole by having the shear present this attachment method is eliminated. In addition, because the indicia carrier 130 is completely fused to the thermoplastic, moisture in high moisture environments is unable to get between the indicia carrier 130 and the molded body itself preventing contaminates from growing. Also, because the indicia carrier 130 is fused to the molded body, the indicia carrier is practically tamper proof. Any attempt to remove or modify the indicia carrier 130 is readily apparent to a casual observer. In addition, because injection molds for tags are easily manufactured with a bale or a loop of plastic that folds around an object and interlocks into a mating feature on the tag and can be used to include a padlock, additional safety is provided. In addition, a process for making labels having RFID is provided.

Thus, during the manufacturing of this product thermoplastics are heated within the barrel of an injection molding by the mechanical shear generated between the screw and the barrel. The temperature of the material exceeds 390 degrees Fahrenheit and is held under pressure until the next shot is required. At this time the material is subject to pressures exceeding 1800 PSI and is forced through the runner and gate systems. Additional heat is generated by the mechanical shear created by the forcing the material through the gates. After the cavity fills, a packing pressure is applied until thermoplastic solidifies and is ejected from the machine. These physical conditions exceed the standard operating procedures for auto clave thereby producing a sterile and safe product. Thus, at the very least all of the stated objectives have been met. Whereas the invention has been shown and described in connection with the embodiments thereof, it will be understood that many modifications, substitutions, and additions may be made which are within the intended broad scope of the following claims. From the foregoing, it can be seen that the present invention accomplishes at least all of the stated objective.

What is claimed is:

1. A method of making detectable signage comprising the steps of:
   heating a filler material and a detectable additive individually;
   mixing the heated filler material with the heated detectable additive to form a homogeneous mixture;
   placing a label having indicia positioned on one side into a cavity of an injection mold with the indicia facing away from the cavity;
   placing a bonding material on a non-indicia side of the label;
   injecting the homogenous mixture into the cavity of the injection mold through a runner system to a gate member having a first and second section; and
   displacing the homogeneous mixture into the mold cavity through the first and second sections of the gate member into the cavity wherein the second section is angled such that the homogeneous mixture is displaced onto an edge of the label nearly perpendicular to the planar surface of the label to hold the label in position against the mold cavity;
   such that the homogeneous mixture bonds to the label forming detectable signage.

2. The method of claim 1 wherein the detectable additive is 5% to 20% of the homogeneous mixture.

3. The method of claim 1 wherein the filler material is a plastic material.

4. The method of claim 1 wherein the detectable additive is in pellet form.

5. The method of claim 1 wherein the filler material is in pellet form.

6. The method of claim 1 wherein the homogenous mixture fuses to the label thereby providing sanitary signage.

7. The method of claim 1 wherein the homogenous mixture forces out all bubbles and wrinkles.

8. A method of making detectable signage comprising the steps of:
   mixing a filler material with a detectable additive;
   heating the mixed filler material and the detectable additive to form a homogeneous mixture;
   placing a label having indicia positioned on one side into a cavity of an injection mold with the indicia facing away from the cavity;
   placing a bonding material on a non-indicia side of the label;
   injecting the homogenous mixture into the cavity of the injection mold through a runner system to a gate member having a first and second section; and
   displacing the homogeneous mixture into the mold cavity through the first and second sections of the gate member into the cavity wherein the second section is angled such that the homogeneous mixture is displaced onto an edge of the label nearly perpendicular to the planar surface of the label to hold the label in position against the mold cavity;
   such that the homogeneous mixture bonds to the label forming detectable signage.

9. The method of claim 8 wherein the filler material and the detectable additive are individually heated and then combined.

* * * * *